(12) United States Patent
Lim et al.

(10) Patent No.: US 9,904,980 B2
(45) Date of Patent: Feb. 27, 2018

(54) DISPLAY APPARATUS AND CONTROLLER AND METHOD OF CONTROLLING THE SAME

(71) Applicant: SAMSUNG ELECTRONICS CO., LTD., Suwon-si (KR)

(72) Inventors: Bo Ra Lim, Seoul (KR); Seon-seok Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 14/744,719

(22) Filed: Jun. 19, 2015

(65) Prior Publication Data
US 2016/0063673 A1 Mar. 3, 2016

(30) Foreign Application Priority Data
Sep. 3, 2014 (KR) .................. 10-2014-0117199

(51) Int. Cl.
*G09G 5/00* (2006.01)
*G06T 3/40* (2006.01)

(52) U.S. Cl.
CPC .................. *G06T 3/4007* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,421,463 B1* | 7/2002 | Poggio | ............... | G06K 9/00228 382/224 |
| 6,512,521 B1* | 1/2003 | Era | .......... | G06T 15/20 345/422 |
| 6,654,067 B1* | 11/2003 | McGee | ............ | G06F 17/30802 348/700 |
| 6,975,335 B2* | 12/2005 | Watanabe | ............. | G06F 3/0481 345/660 |
| 7,158,158 B1* | 1/2007 | Fleming | .................. | G06T 3/403 345/660 |
| 7,667,699 B2* | 2/2010 | Komar | .................. | G06T 3/0018 345/427 |
| 7,714,859 B2* | 5/2010 | Shoemaker | ............. | G06T 17/20 345/418 |
| 7,715,656 B2* | 5/2010 | Zhou | ..................... | G06T 3/0018 345/650 |
| 7,777,766 B2* | 8/2010 | Okumura | .................. | G09G 5/00 345/660 |
| 7,889,212 B2* | 2/2011 | Schulz | .................. | G06F 3/0481 345/428 |
| 7,995,078 B2* | 8/2011 | Baar | ..................... | G06T 3/0018 345/660 |
| 8,040,419 B2* | 10/2011 | Makioka | .................. | G06T 3/40 348/161 |

(Continued)

*Primary Examiner* — M Good Johnson
(74) *Attorney, Agent, or Firm* — Sughrue Mion, PLLC

(57) ABSTRACT

A display apparatus including: a display; and a controller configured to detect an object in an input image, divide the image into a first region of the image corresponding to a location of the detected object and a second region of the image corresponding to a region of the input image excluding the first region, adjust the first region and the second region using different scale factors, and control the display to display the image having the adjusted first and second regions.

18 Claims, 35 Drawing Sheets

(56) References Cited

U.S. PATENT DOCUMENTS

| | | | |
|---|---|---|---|
| 8,106,927 B2* | 1/2012 | Shoemaker | G06T 5/006 345/665 |
| 8,311,915 B2* | 11/2012 | Baar | G06F 3/0481 345/660 |
| 8,543,166 B2* | 9/2013 | Choi | G06F 1/1601 345/156 |
| 2002/0167512 A1* | 11/2002 | Lee | G06T 7/002 345/419 |
| 2002/0186224 A1* | 12/2002 | Debevec | G06T 11/001 345/589 |
| 2005/0073512 A1* | 4/2005 | Liu | G09G 3/20 345/204 |
| 2005/0134610 A1* | 6/2005 | Doyle | G06F 3/0481 345/647 |
| 2007/0033543 A1* | 2/2007 | Ngari | G06F 3/0481 715/788 |
| 2007/0230943 A1* | 10/2007 | Chang | G03B 37/00 396/322 |
| 2007/0273926 A1* | 11/2007 | Sugiyama | H04N 7/163 358/1.18 |
| 2010/0262907 A1* | 10/2010 | Shoemaker | G06F 3/0481 715/702 |
| 2010/0290673 A1* | 11/2010 | Miyashita | G06K 9/00664 382/103 |
| 2012/0308204 A1* | 12/2012 | Hwang | G06F 3/04847 386/241 |
| 2014/0300758 A1* | 10/2014 | Tran | H04N 5/225 348/207.1 |
| 2014/0355879 A1* | 12/2014 | Agosta | G06K 9/00791 382/170 |
| 2014/0375694 A1* | 12/2014 | Ohba | G06T 3/40 345/660 |
| 2015/0055828 A1* | 2/2015 | Zhao | G01S 17/50 382/103 |
| 2015/0172532 A1* | 6/2015 | Izawa | H04N 5/23212 348/333.11 |
| 2015/0213624 A1* | 7/2015 | Lee | G06T 7/0042 382/103 |
| 2015/0227779 A1* | 8/2015 | Kawai | H04N 13/0018 382/154 |
| 2016/0098842 A1* | 4/2016 | Frosio | G06T 7/0083 382/199 |

* cited by examiner frame1 frame2 frame1 frame2 frame1 frame2

DISPLAY APPARATUS AND CONTROLLER AND METHOD OF CONTROLLING THE SAME

CROSS-REFERENCE TO RELATED APPLICATION(S)

This application claims the benefit of Korean Patent Application No. 10-2014-0117199, filed on Sep. 3, 2014 in the Korean Intellectual Property Office, the disclosure of which is incorporated herein by reference in its entirety.

BACKGROUND

1. Field

One or more exemplary embodiments relate to display apparatuses for enhancing or augmenting an image and methods of controlling the same.

2. Description of the Related Art

A display apparatus is an apparatus configured to display visual and stereoscopic image information.

In recent years, flat display devices have been developed that are capable of being installed in less space than cathode ray tubes (CRTs) due to comparatively reduced weight and volume, have a large-sized screen, are easily fabricated as a flat panel, provide high image quality, and have excellent performance.

Examples of the flat display devices include liquid crystal displays (LCDs), electro-luminescence displays (ELDs), field emission displays (FEDs), plasma display panels (PDPs), thin film transistor liquid crystal displays (TFT-LCDs), and flexible display devices.

These display apparatuses convert a format of an input image into a format which can be displayed by adjusting resolution, or the like of the image.

That is, display apparatuses adjust resolution and size of images in accordance with intrinsic resolution thereof.

If an aspect ratio of an image to be displayed is different from an aspect ratio of a display apparatus, the image may be reduced or enlarged in a predetermined direction in the display apparatus. That is, if the aspect ratio of the image to be displayed is different from the aspect ratio of the display apparatus, the original image may be distorted.

Meanwhile, in portable display apparatuses or small-sized display apparatuses, displaying an image having a high resolution may be limited.

For this purpose, a scalable video coding method is suggested.

Scalable video coding refers to an encoding method making it possible to adjust the resolution, the frame rate, the signal-to-noise ratio (SNR), and others of an image by truncating a part of a pre-compressed bit stream in accordance with environmental conditions, such as the transmission bit rate, the transmission error rate, and system resources.

In the scalable video coding method, the resolution of an image may be performed only by up-scaling or down-scaling the image to a predetermined size or using a predetermined scaling factor.

In addition, the display apparatus may highlight a desired region or an object by only increasing a size, brightness, or definition of the desired region or object.

SUMMARY

Therefore, it is an aspect of one or more exemplary embodiments to provide display apparatuses capable of augmenting an image by applying a scaling process adaptive to a composition of the image and methods of controlling the same.

It is another aspect of one or more exemplary embodiments to provide display apparatuses capable of scaling up at least one object in an image, and methods of controlling the same.

Additional aspects of one or more exemplary embodiments will be set forth in part in the description which follows and, in part, will be obvious from the description, or may be learned by practice of one or more exemplary embodiments.

In accordance with one aspect of one or more exemplary embodiments, there is provided a display apparatus including: a display; and a controller configured to detect an object in an input image, divide the image into a first region of the image corresponding to a location of the detected object and a second region of the image corresponding to a region of the input image excluding the first region, adjust the first region and the second region using different scale factors, and control the display to display the image having the adjusted first and second regions.

A frame of the input image may include a plurality of regions having a same size, the first region may include one or more regions among the plurality of regions having the same size, the first region may be scaled using a scaling factor less than 1, the second region may include a plurality of regions among the plurality of regions having the same size excluding the one or more regions of the first region, the plurality of regions of the second region may be scaled using a scale factor greater than the scale factor of the first region, and a region among the plurality of regions of the second region farther from the first region is scaled using a greater scale factor than another region among the plurality of regions of the second region closer to the first region.

The input image may include a plurality of frames, and the controller may be further configured to detect motion vectors by comparing a first frame of the plurality of frames with a second frame of the plurality of frames, detect a vanishing point at which the detected motion vectors converge based on the motion vectors, identify a region where the detected vanishing point is located, and set the identified region as the first region.

The controller may be further configured to detect a composition of the image, detect a vanishing point based on the detected composition, identify a region where the detected vanishing point is located, and set the identified region as the first region.

The controller may be further configured to determine whether a skyline exists in the input image and, in response to determining that the skyline exists, set a predetermined region as the first region.

The controller may be further configured to scale up the first region using a predetermined scale factor and scale down the second region based on a predetermined scale factor, and the predetermined scale factor may be a scale factor corresponding to the Gaussian distribution.

In accordance with another aspect of one or more exemplary embodiments, there is provided a display apparatus including: a display; and a controller configured to detect motion within an input image, identify a first region of the input image at which the detected motion converges, adjust the first region and a second region of the input image using different scale factors, and control the display to display the image having the adjusted first and second regions.

A frame of the input image may include a plurality of regions having a same size, the first region may include one or more regions among the plurality of regions having the same size, the first region may be scaled using a scale factor less than 1, the second region may include a plurality of regions among the plurality of regions having the same size excluding the one or more regions of the first region, and the plurality of regions of the second region may be scaled using a scale factor greater than the scale factor of the first region.

The input image may include a plurality of frames, and the controller may be further configured to detect motion vectors by comparing a first frame of the plurality of frames with a second frame of the plurality of frames, detect a vanishing point based on the motion vectors, determine a region where the detected vanishing point is located, and set the determined region as the first region.

In accordance with another aspect of one or more exemplary embodiments, there is provided a display apparatus including: a display; and a controller configured to determine whether a skyline exists in an input image, adjust, in response to determining that a skyline exists in the input image, a predetermined first region and a second region of the input image using different scale factors, adjust, in response to determining that the skyline does not exist in the input image, the first region and the second region using the same scale factor, and control the display to display the image having the adjusted first and second regions.

A frame of the input image may include a plurality of regions having a same size, the first region may include one or more regions among the plurality of regions having the same size, the first region may be scaled using a scale factor less than 1, the second region may include a plurality of regions among the plurality of regions having the same size excluding the one or more regions of the first region, and the plurality of regions of the second region may be scaled using a scale factor greater than the scale factor of the first region.

In accordance with a further aspect of one or more exemplary embodiment, there is provided a display apparatus including: a display; and a controller configured to detect an object from an input image, scale up a first region of the input image where an object is located using a predetermined scale factor, scale a second region of the input image based on the predetermined scale factor, and control the display to display the image having the scaled-up first region and scaled second region.

The controller may include: an object detection unit configured to detect the object; a scaling unit configured to scale the first region where the object is located using the predetermined scale factor; and an offset adjusting unit configured to calculate an offset value corresponding to a difference between a size of the input image and a size of the scaled first region, and to scale the second region based on the calculated offset value.

The controller may be further configured to further scale the scaled first region and second region using the predetermined scale factor when an aspect ratio of the display is different from an aspect ratio of the input image.

In accordance with a further aspect of one or more exemplary embodiments, there is provided a method of controlling a display apparatus including: detecting an object from an input image; dividing the input image into a first region including the detected object and a second region excluding the first region; adjusting the first region and second region using different scale factors; and outputting the image having the scaled-up first region and scaled second region.

The adjusting the first region and second region using different scale factors may include: scaling the first region using a scale factor less than 1; and scaling the second region using a scale factor greater than the scale factor of the first region.

The dividing the input image may include: detecting motion within the input image; identifying a region at which the detected motion converges; and setting the identified region as the first region.

The dividing the input image into the first region may include: detecting a composition of the input image based on the detected object; detecting a vanishing point based on the detected composition; identifying a region where the detected vanishing point is located; and setting the identified region as the first region.

The dividing the input image may include: determining whether a skyline exists in the input image based on edges of the detected object; and setting, in response to determining that the skyline exists, a predetermined region as the first region.

The adjusting the first region and second region using different scale factors may include: scaling up the first region using a predetermined scale factor; and scaling down the second region based on the predetermined scale factor. The predetermined scale factor may be a scale factor corresponding to the Gaussian distribution.

In accordance with a further aspect of one or more exemplary embodiments, there is provided a controller including: a processor; and a memory storing a program, wherein, when the program is executed by the processor, the processor is configured to: detect a point of interest in an input image, divide the input image into a first region including the point of interest and a second region not including the point of interest, scale the first region and the second region using different scale factors, and output the image having the scaled first and second regions.

When the program is executed by the processor, the processor may be further configured to: detect motion within the input image, determine a point where the detected motion converges, and select the point where the detected motion converges as the point of interest.

When the program is executed by the processor, the processor may be further configured to: determine whether a skyline exists in the input image, select, in response to determining that a skyline exists in the input image, a predetermined point as the point of interest, and select a predetermined first region based on the predetermined point as first image.

When the program is executed by the processor, the processor may be further configured to: detect an object within the input image, and select the object as the point of interest.

According to one or more exemplary embodiments, the display apparatus may provide improved realism and a sense of distance by adjusting scale factors based on motion directions of an object and a skyline in an image.

The display apparatus may provide the same effect as a curved display.

Furthermore, a stereoscopic effect may be enhanced without using additional devices such as glasses by scaling up at least one object in an image, and an optical illusion of watching a three-dimensional image may be caused.

BRIEF DESCRIPTION OF THE DRAWINGS

These and/or other aspects of the disclosure will become apparent and more readily appreciated from the following description of one or more exemplary embodiments, taken in conjunction with the accompanying drawings of which.

DETAILED DESCRIPTION

Figure 1:
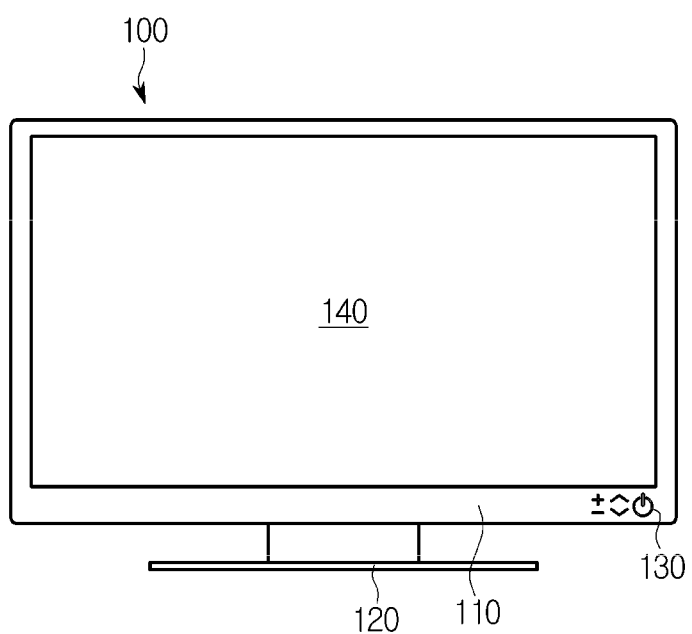
FIG. 1 is a front view of a display apparatus according to an exemplary embodiment.

Reference will now be made in detail to one or more exemplary embodiments, examples of which are illustrated in the accompanying drawings, wherein like reference numerals refer to like elements throughout.

FIG. 1 is a front view of a display apparatus 100 according to an exemplary embodiment.

The display apparatus 100 is an apparatus capable of displaying an image, such as a television, a monitor, and a display of a mobile terminal, such as a laptop computer, a smartphone, and a tablet personal computer (PC). FIG. 1 illustrates the display apparatus 100 as a television.

The display apparatus 100 may communicate with a remote control to receive a manipulation signal from the remote control and perform an operation based on the received manipulation signal.

The display apparatus 100 includes a bezel 110 that covers an image non-display region, and a stand 120 installed at a lower end portion of the bezel 110.

The display apparatus 100 may be mounted on a wall using a bracket.

The display apparatus 100 includes a physical input 130, i.e., an input unit 130, disposed on the bezel 110, configured to receive an operation command from a user and a display 140, i.e., a display unit 140, installed in the bezel 110 exposing an image displaying surface and configured to display an image.

The bezel 110 defines an external appearance of the display apparatus 100 and is coupled to a cover covering the back surface of the display 140.

The physical input 130 may be disposed on the bezel 110 and include a plurality of buttons.

The plurality of buttons may include a power button, a channel/volume button, a screen adjustment button, and the like.

The display 140 may include at least one display panel selected from the group consisting of a liquid crystal display (LCD) panel, an electro-luminescence display (ELD) panel, a field emission display (FED) panel, a plasma display panel (PDP), a thin film transistor liquid crystal display (TFT-LCD) panel, and an organic light emitting display (OLED) panel.

The display apparatus 100 may also include a sound output unit, i.e., a speaker, an audio output interface, or an audio jack, to output image-related sounds.

The display apparatus 100 may further include a driving module 150 to operate the display 140 in response to the operation command input by the physical input 130 or the remote control. This will be described with reference to FIG. 2.

Figure 2:
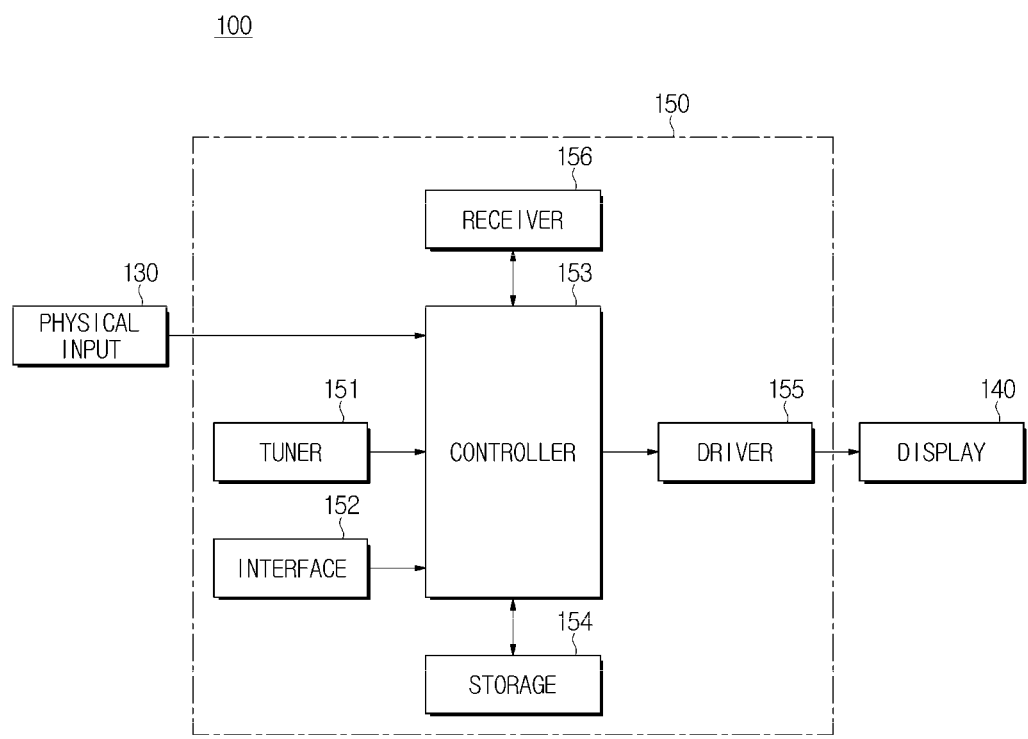
FIG. 2 is a block diagram illustrating a display apparatus according to an exemplary embodiment.

FIG. 2 is a block diagram illustrating a display apparatus according to an exemplary embodiment.

The physical input 130 receives operation commands from the user and transmits a signal corresponding to the input operation commands to a controller 153, i.e., a processor.

The physical input 130 may also receive a mode selection command to select a normal mode or a stereoscopic mode.

In the normal mode, a plurality of regions constituting an image having a predetermined size may be scaled using the same scale factor. In the stereoscopic mode, the plurality of regions constituting the image may be scaled using different scale factors. However, this is only an example, and the plurality of regions constituting the image may be scaled using different scale factors in the normal mode.

The display 140 displays images included in video signals included in broadcast signals.

When a command to change channels is input while an image of a broadcast signal is displayed, the display 140 does not display an image of a current channel but displays an image of another channel. The display 140 may also display images of a plurality of channels.

The display 140 may also display an image stored in a storage 154 or an image of an external device connected to an interface 152, i.e., an input interface, an input/output (I/O) interface, or an interface unit.

The display 140 displays an image by scaling the plurality of regions using different scale factors based on a composition of the image or motion in the image.

Here, the image includes a plurality of regions having the same size. Each region may also be referred to as a block.

When a skyline exists in the image, the display 140 displays the image by scaling a predetermined region and the other region using different scale factors.

Accordingly, the display 140 may provide visual effects similar to a curved display.

The driving module 150 includes a tuner 151, i.e., a tuner unit 151, an interface, i.e., an interface unit 152, a controller 153, a storage 154, i.e., a memory, a driver 155, i.e., a drive unit 155, and a receiver 156, i.e., a communication unit 156.

The tuner unit 151 receives broadcast signals transmitted by one of a plurality of broadcasting stations by selecting at least one frequency band.

That is, the tuner unit 151 includes at least one tuner and searches for broadcast signals of a desired station using the at least one tuner.

The broadcast signals may be digital broadcast signals or analog broadcast signals.

The interface 152 includes a universal serial bus (USB) port, a video/audio port, an HDMI port, a wireless receiver, or the like, receives an image from an external device connected to these ports and transmits the received image to the controller 153.

The controller 153 separates video signals from audio signals within the broadcast signals received by the tuner unit 151 and performs signal processing on the separated video signals and audio signals.

More particularly, the controller 153 demodulates the broadcast signals of the station selected by the tuner unit 151, separates the video signals and audio signals from the broadcast signals, decodes the separated video signals and the audio signals, converts the respective signals in accordance with signal processing standards, and outputs the resultant signals.

The controller 153 controls the output of images and sounds based on a signal input to the physical input 130 or the receiver 156.

The controller 153 controls the operation of the tuner unit 151, the display 140, i.e., the display 140, and a sound unit, i.e., a speaker or an audio jack, upon receiving a power-on signal input through the physical input 130, controls operation the tuner unit 151 and the display 140 upon receiving a channel button signal input through the physical input 130, and controls the operation of the sound unit upon receiving a volume button signal input through the physical input 130.

The controller 153 controls the operation of the tuner unit 151 and the display 140 upon receiving a channel button signal input through the remote control and controls the operation of the sound unit upon receiving a volume button signal input through the remote control.

The controller 153 controls operation of the tuner unit 151, the display 140, and the sound unit upon receiving a command to select a broadcasting input through the remote control and controls an execution of content received from a content providing server, received from an external device, or stored in the storage 154 upon receiving a command to reproduce the content.

When displaying an image received from at least one from the group consisting of the tuner unit 151, the interface 152, and the storage 154, the controller 153 extracts or detects an object from an image to be displayed, identifies one region including the extracted object, and scales the region including the object and the other region using different scale factors.

The image includes a plurality of regions having a predetermined size.

That is, the controller 153 sets one region including an object among a plurality of regions constituting the image as a first region and sets the other region(s) excluding the first region as a second region, and then scales the first region and the second region using different scale factors.

Also, the controller 153 may control scaling of the image only when the stereoscopic mode is selected.

That is, when the normal mode is selected, the controller 153 scales the plurality of regions constituting the image using the same scale factor. When the stereoscopic mode is selected, the controller 153 may scale the first region and the second region using different scale factors.

In this case, a scale factor for the first region may be less than 1, which is less than a scale factor for the second region.

In addition, the controller 153 may scale one region of the second region closer to the first region and another region of the second region farther from the first region using different scale factors.

In this case, the controller 153 may scale the closer region of the second region using a smaller scale factor than the scale factor for the farther region of the second region.

The controller 153 may detect motion vectors, a composition, or a skyline of an image based on the object, and set the first region based on the detection results.

One or more methods of setting the first region according to one or more exemplary embodiments will be described in more detail below.

For example, the controller 153 extracts a first frame and a second frame of an input image, detects motion vectors by comparing the extracted first frame with the second frame, identifies a region at which the detected motion vectors converge, and sets the identified region as the first region.

In this regard, the region at which the motion vectors converge may have a vanishing point where the motion vectors meet.

Also, the controller 153 may set a vanishing point region in which the vanishing point is located and a region surrounding the vanishing point region as the first region.

The first frame is a frame displayed before the second frame is displayed.

As another example, the controller 153 identifies a composition of an image based on an object of the image, identifies a region at which edges of the object converge when the identified composition is a diagonal composition, and sets the identified region as a first region.

In this case, the region at which the edges of the object converge may include a vanishing point where the edges of the object meet.

As another example, the controller 153 identifies whether a skyline exists in an input image and sets a predetermined region as the first region upon determination that the skyline exists.

In this case, the predetermined region includes a central region among the plurality of regions.

The predetermined region may also include the central region and regions surrounding the central region.

Also, the existence of the skyline may be determined by determining whether a border line between objects and the sky has a predetermined length or greater.

The storage 154 stores scale factors for the first region and the second region.

The storage 154 may also store content including images.

The driver 155 drives the display 140 based on a command of the controller 153.

The receiver 156 receives signals from the remote control and transmits the received signals to the controller 153.

Figure 3:
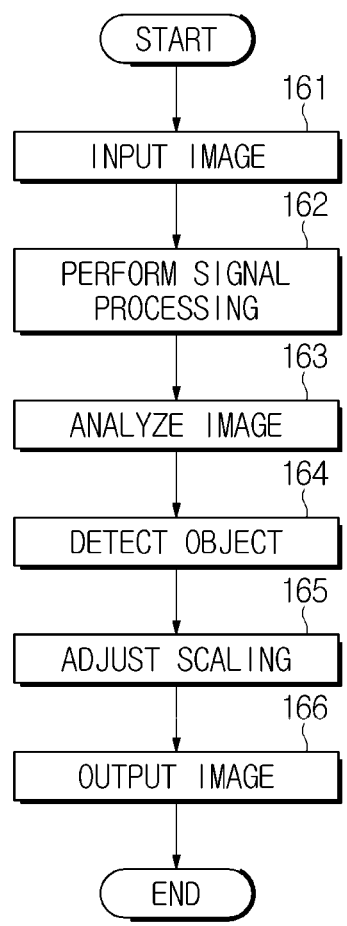
FIG. 3 is a flowchart illustrating a method of controlling a display apparatus according to an exemplary embodiment.

FIG. 3 is a flowchart illustrating a method of controlling a display apparatus according to an exemplary embodiment.

When a power-on signal is input to the physical input 130 or the receiver 156, the display apparatus powers on, displays a standby screen, and displays an image of content when a command to reproduce the content is input by a user.

When the display apparatus is a television, the display apparatus displays video signals among broadcast signals of the selected station as an image.

That is, the display apparatus receives an image through a tuner unit, an interface, or a storage (161) and performs signal processing on the input image (162).

The signal processing includes separating image signals from sound signals, and may also include converting analog image signals into digital image signals.

Then, the display apparatus analyzes the signal-processed image (163) and detects an object based on the analysis results (164).

The image analysis may include extracting a plurality of frames based on an output order of input images and comparing at least two frames among the plurality of extracted frames.

In this case, the two frames include a first frame and a second frame, and the second frame may be displayed after the first frame.

In addition, the detecting of the object may include analyzing brightness of images of a plurality of frames and a speed, size, height, density, and color tone of at least one object, and comparing these properties.

Then, the display apparatus sets one region including the object among a plurality of regions of the image as a first region and sets the other region excluding the first region as a second region.

The display apparatus adjusts scaling of the image by scaling the first region using a scale factor less than 1 and scaling the second region using a scale factor greater than the first region (165) and outputs the scaled image (166). Alternatively, the scale factor of the first region may be greater than 1 or greater than the scale factor of the second region.

The adjustment of scaling of the image, according to one or more exemplary embodiments, will be described in more detail below.

FIGS. 4A through 6B are diagrams for describing image scaling when an object to be displayed on a display apparatus is zoomed-in according to one or more exemplary embodiments.

Figure 4A:
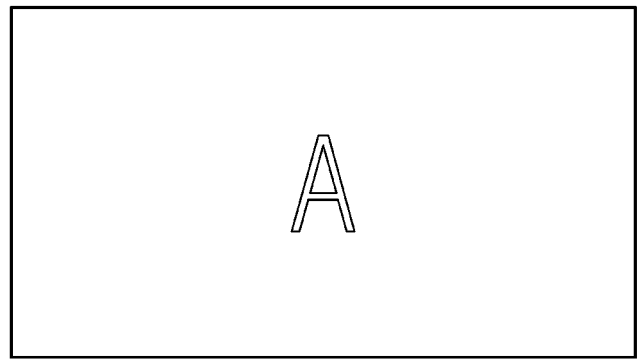
FIGS. 4A through 6B are diagrams for describing image scaling when an object to be displayed on a display apparatus is zoomed-in according to one or more exemplary embodiments.
Figure 4B:
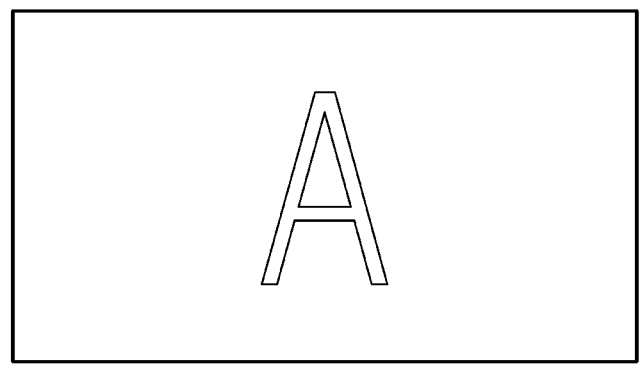

A first frame (frame1) illustrated in FIG. 4A includes an object A, and a second frame (frame2) illustrated in FIG. 4B includes the zoomed-in object A.

The display apparatus displays the first frame and then the second frame in which the object is enlarged.

Here, the second frame is a reference frame for scaling the first frame. When the first frame is displayed, the display apparatus adjusts scaling of the first frame with reference to the second frame, and then displays the first frame.

Figure 5:
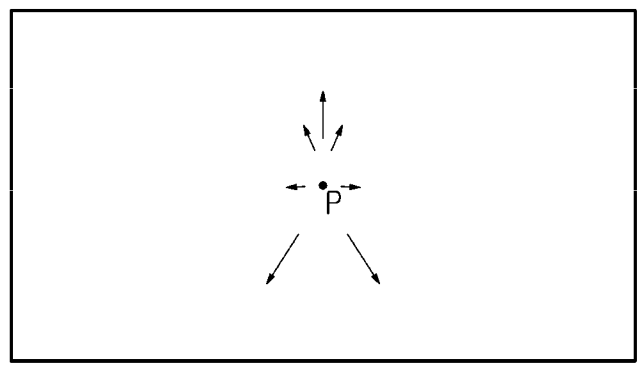

As illustrated in FIG. 5, the display apparatus detects objects in the first frame and in the second frame, respectively, detects motion vectors by comparing positions and sizes of the detected object of the first frame with those of the second frame, detects a vanishing point p at which the detected motion vectors converge, and identifies a region where the vanishing point p is located.

Figure 6A:
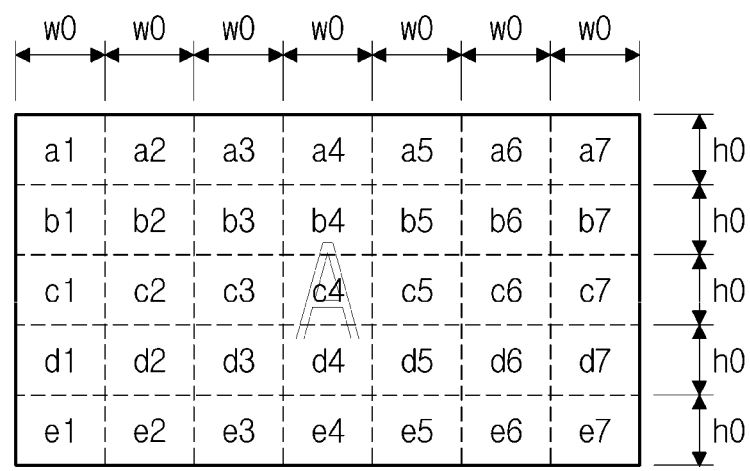

As illustrated in FIG. 6A, the first frame of the image includes a plurality of regions a1-a7, b1-b7, c1-c7, d1-d7, and e1-e7, and the plurality of regions are formed as blocks having a predetermined size and scaled using a same scale factor (e.g., 1).

That is, each of the blocks constituting the plurality of regions has a width of w0 and a height of h0.

The display apparatus scales the plurality of regions using different scale factors based on the position of the vanishing point so that the regions among the plurality of regions have different sizes.

Figure 6B:
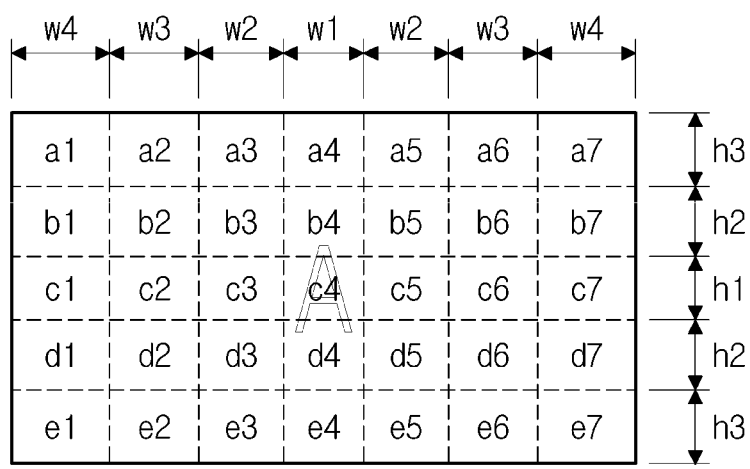

As illustrated in FIG. 6B, the display apparatus identifies the position of the vanishing point, identifies a region c4 where the vanishing point is located, and scales down a first region (row c in column 4) including the vanishing point using a scale factor less than 1.

Then, the display apparatus scales up a second region excluding the first region among the plurality of regions (the other regions except for region c4) using a scale factor greater than that of the first region.

A description will be given under an assumption that each region of FIG. 6A is scaled using a predetermined scale factor, i.e., a scale factor of 1 for the width w0 and a scale factor of 1 for the height h0.

As illustrated in FIG. 6B, the display apparatus scales row c and column 4 including the first region c4 using a scale factor less than 1.

For example, the display apparatus scales a width w1 of column 4 including the first region using a scale factor of 0.9 and a height h1 of row c including the first region using a scale factor of 0.9.

In addition, when the display apparatus scales the second region using a scale factor greater than that of the first region, regions further from the first region c4 may be scaled using a greater scale factor.

For example, a width w2 of column 3 and column 5 of the second region is scaled using a scale factor of 0.95, a width w3 of column 2 and column 6 is scaled using a scale factor of 1, a width w4 of column 1 and column 7 is scaled using a scale factor of 1.1, a height h2 of row b and row d is scaled using a scale factor of 1, and a height of h3 of row a and row e is scaled using a scale factor of 1.05.

Although the scale factors of the rows and columns of the plurality of regions may be adjusted according to one or more exemplary embodiments, the scale factors of only one of the rows and the columns of the plurality of regions may be adjusted.

By adjusting the scale factor for the first region including the vanishing point to be less than that for the second region as described above, the display apparatus may provide similar effects as those provided by a curved display.

FIGS. 7A through 9B are diagrams for describing image scaling when an object to be displayed on a display apparatus is zoomed-out according to one or more exemplary embodiments.

Figure 7A:
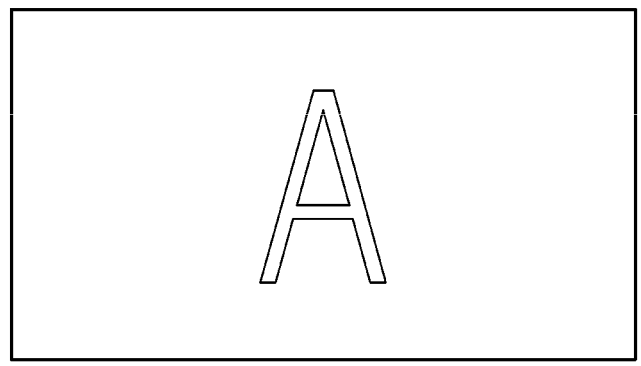
FIGS. 7A through 9B are diagrams for describing image scaling when an object to be displayed on a display apparatus is zoomed-out according to one or more exemplary embodiments.
Figure 7B:
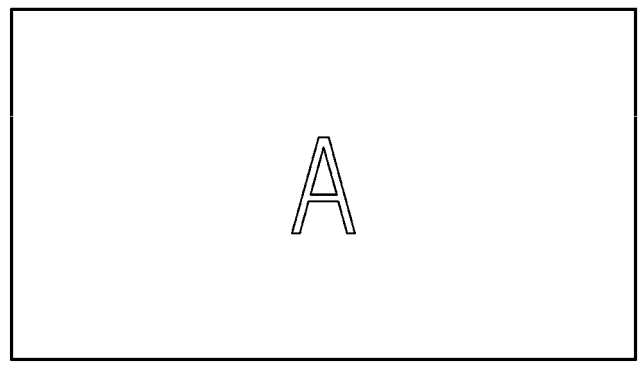

A first frame (frame1) illustrated in FIG. 7A includes an object A, and a second frame (frame2) illustrated in FIG. 7B includes the zoomed-out object A.

The display apparatus displays the first frame and then the second frame in which the object is reduced.

Figure 8:
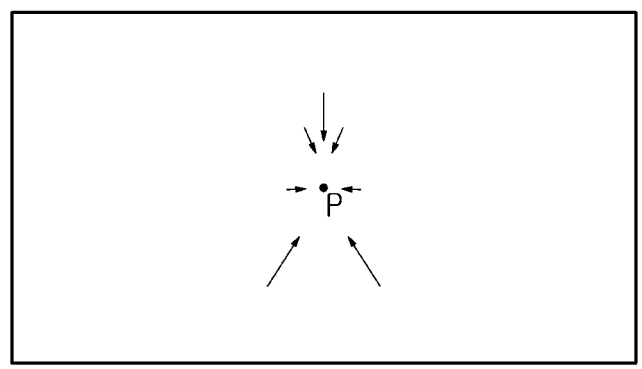

Here, the second frame is a reference frame for scaling the first frame. When the first frame is displayed, the display apparatus adjusts scaling of the first frame with reference to the second frame and then displays the first frame As illustrated in FIG. 8, the display apparatus detects objects in the first frame and in the second frame, respectively, detects motion vectors by comparing positions and sizes of the detected object of the first frame with those of the second frame, detects a vanishing point p at which the detected motion vectors converge, and identifies a region where the vanishing point p is located.

Figure 9A:
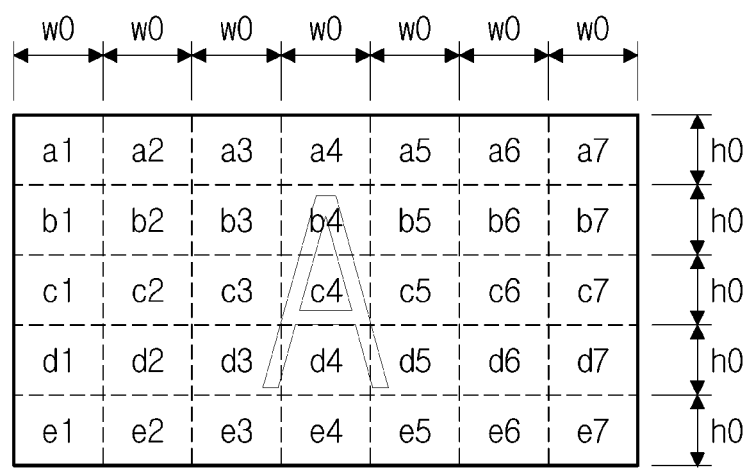

As illustrated in FIG. 9A, the first frame of the image includes a plurality of regions a1-a7, b1-b7, c1-c7, d1-d7, and e1-e7, and the plurality of regions are formed as blocks having a predetermined size and scaled using the same scale factor.

That is, each of the blocks constituting the plurality of regions has a width of w0 and a height of h0.

The display apparatus scales the plurality of regions using different scale factors based on the position of the vanishing point so that the regions among the plurality of regions have different sizes.

Figure 9B:
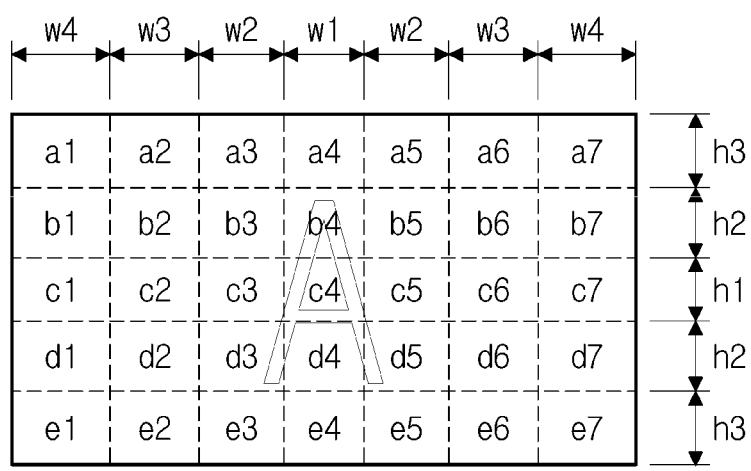

As illustrated in FIG. 9B, the display apparatus identifies the position of the vanishing point, identifies a region c4 where the vanishing point is located, and scales down a first region (row c in column 4) including the vanishing point using a scale factor less than 1.

Then, the display apparatus scales up a second region except for the first region among the plurality of regions (the other regions except for region c4) using a scale factor greater than that of the first region.

As illustrated in FIG. 9A, the plurality of regions are scaled using a predetermined scale factor, i.e., a scale factor of 1 for the width w0 and a scale factor of 1 for the height h0.

As illustrated in FIG. 9B, the display apparatus scales row c and column 4 including the first region using a scale factor less than 1.

For example, the display apparatus scales a width w1 of column 4 including the first region using a scale factor of 0.9 and a height h1 of row c including the first region using a scale factor of 0.9.

Then, the display apparatus scales a width w2 of column 3 and column 5 of the second region using a scale factor of 0.95, a width w3 of column 2 and column 6 using a scale factor of 1, a width w4 of column 1 and column 7 using a scale factor of 1.1, a height h2 of row b and row d using a scale factor of 1, and a height h3 of row a and row e using a scale factor of 1.05.

Thus, regions in columns 1 and 7 and rows a and e are scaled up.

By adjusting the scale factor for the first region including the vanishing point to be less than that for the second region as described above, the display apparatus may provide a similar effect as a curved display.

FIGS. 10A through 12B are diagrams for describing image scaling when a position of an object to be displayed on the display apparatus is changed according to one or more exemplary embodiments.

Figure 10A:
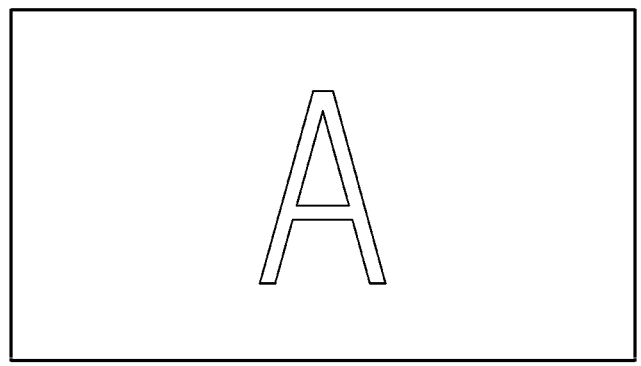
FIGS. 10A through 12B are diagrams for describing image scaling when a position of an object to be displayed on the display apparatus is changed according to one or more exemplary embodiments.
Figure 10B:
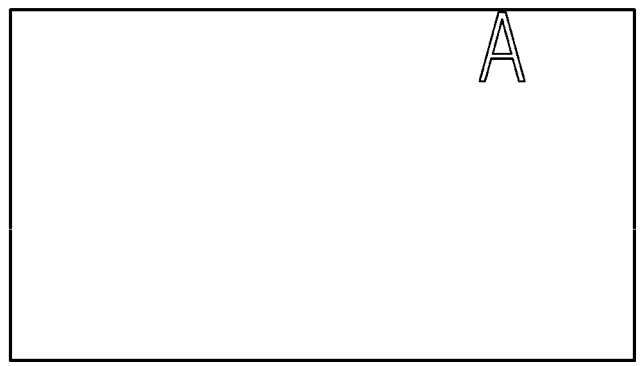

A first frame (frame1) illustrated in FIG. 10A includes an object A, and a second frame (frame1) illustrated in FIG. 10B includes the zoomed-out object A, the position of which is changed.

That is, the display apparatus displays the first frame and then the second frame in which the object is reduced and the position of the object is changed.

Figure 11:
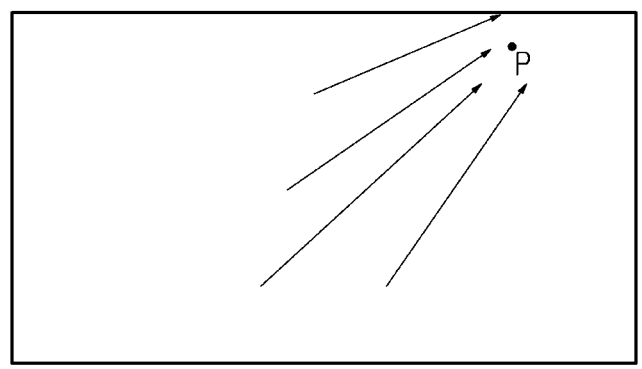

As illustrated in FIG. 11, the display apparatus detects objects in the first frame and in the second frame, respectively, detects motion vectors by comparing positions and sizes of the detected object of the first frame with those of the second frame, detects a vanishing point p at which the detected motion vectors converge, and identifies a region where the vanishing point p is located.

Figure 12A:
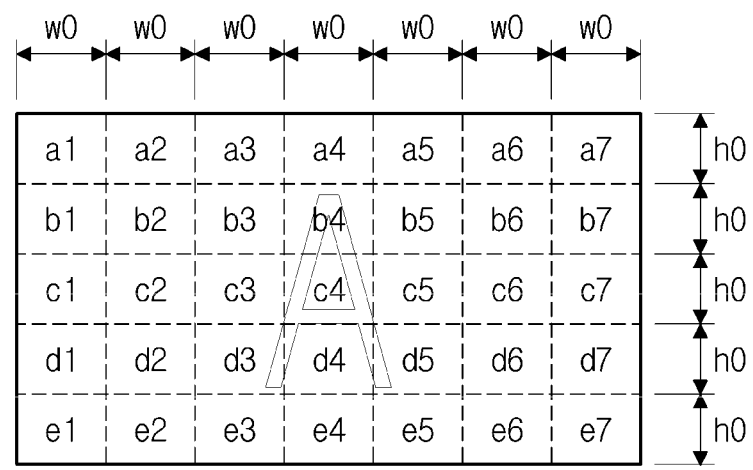

As illustrated in FIG. 12A, the first frame of the image includes a plurality of regions a1-a7, b1-b7, c1-c7, d1-d7, and e1-e7, and the plurality of regions are formed as blocks having a predetermined size and scaled using the same scale factor.

That is, each of the blocks constituting the plurality of regions has a width of w0 and a height of h0.

The display apparatus scales the plurality of regions having the predetermined size using different scale factors based on detection results of the vanishing point so that the plurality of regions have different sizes.

Figure 12B:
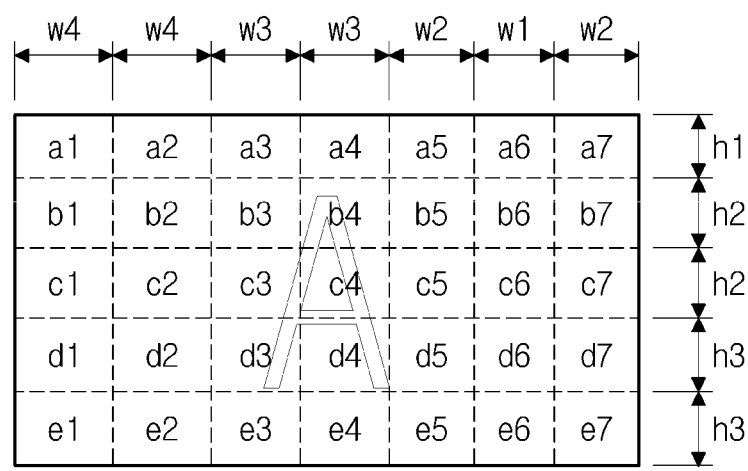

As illustrated in FIG. 12B, the display apparatus identifies the position of the vanishing point, identifies a region a6 where the vanishing point is located, and scales down a first region (row a in column 6) including the vanishing point using a scale factor less than 1.

Then, the display apparatus scales up a second region(s) excluding the first region among the plurality of regions (the other regions except for region a6) using a scale factor greater than that of the first region.

As illustrated in FIG. 12A, the plurality of regions are scaled using a predetermined scale factor, i.e., a scale factor of 1 for the width w0 and a scale factor of 1 for the height h0.

As illustrated in FIG. 12B, the display apparatus scales row a and column 6 including the first region using a predetermined scale factor less than 1.

For example, the display apparatus scales a width w1 of column 6 including the first region using a scale factor of 0.9 and a height h1 of row a1 to a7 including the first region using a scale factor of 0.9.

Then, the display apparatus scales a width w2 of column 5 and column 7 of the second region using a scale factor of 0.95, a width w3 of column 3 and column 4 using a scale factor of 1, a width w4 of column 1 and column 2 using a scale factor of 1.1, a height h2 of row b and row c using a scale factor of 1, and a height h3 of row d and row e using a scale factor of 1.05.

Thus, regions in columns 1 and 2 and rows d and e are scaled up.

By adjusting the scale factor for the first region including the vanishing point to be less than that for the second region as described above, the display apparatus may provide a similar effect as that provided by a curved display.

Figure 13A:
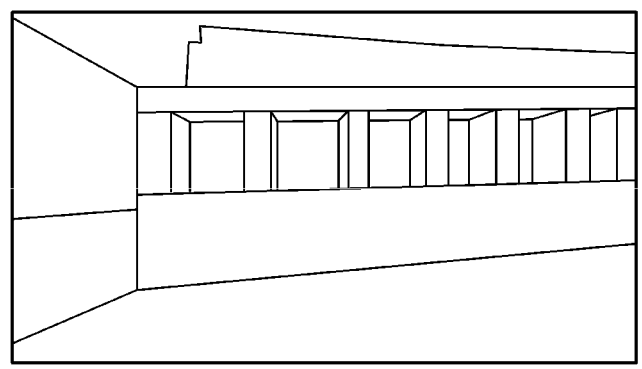
FIGS. 13A through 14B are diagrams for describing image scaling when a composition of an object to be displayed on a display apparatus is a diagonal composition according to one or more exemplary embodiments.

FIGS. 13A through 14B are diagrams for describing image scaling when a composition of an object to be displayed on a display apparatus is a diagonal composition according to one or more exemplary embodiments As illustrated in FIG. 13A, the image includes an object having a diagonal composition.

As such, when the display apparatus determines that the image of the frame to be displayed is an image having a diagonal composition, the display apparatus identifies a vanishing point in the diagonal composition.

Figure 13B:
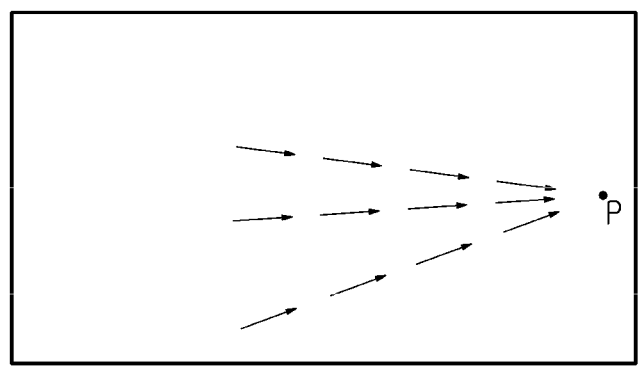

As illustrated in FIG. 13B, the display apparatus detects the vanishing point p at which edges of the object converge, and then identifies a region where the vanishing point p is located.

Figure 14A:
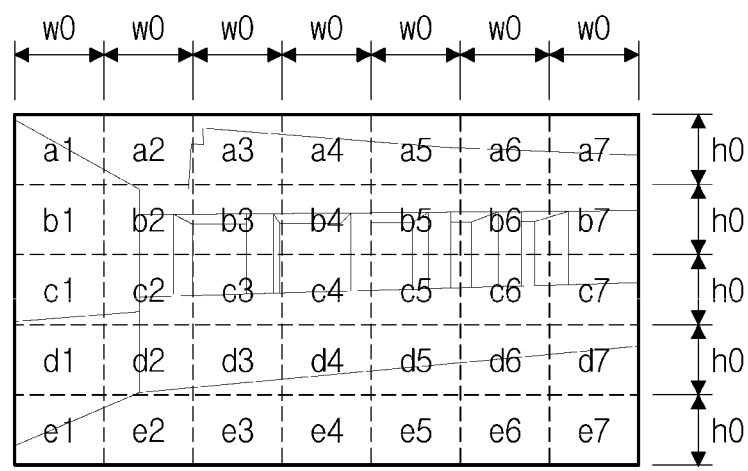

As illustrated in FIG. 14A, the image includes a plurality of regions a1-a7, b1-b7, c1-c7, d1-d7, and e1-e7, and the plurality of regions are formed as blocks having a predetermined size and are scaled using the same scale factor.

That is, each of the blocks constituting the plurality of regions has a width of w0 and a height of h0.

The display apparatus scales the plurality of regions having the predetermined size using different scale factors based on the detection results of the vanishing point so that the plurality of regions have different sizes.

Figure 14B:
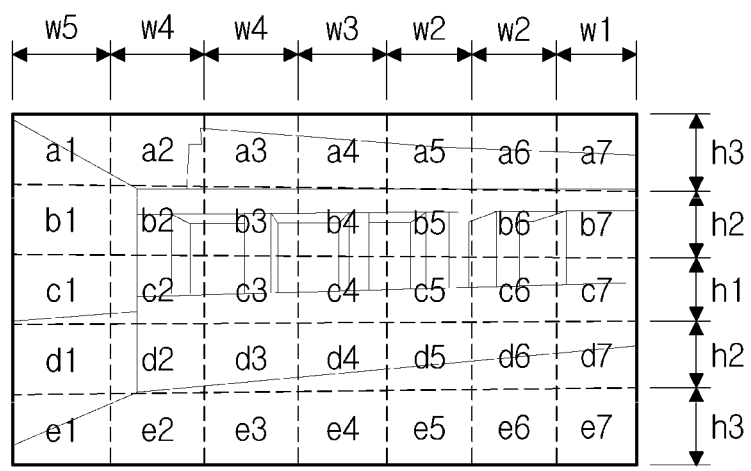

As illustrated in FIG. 14B, the display apparatus identifies the position of the vanishing point, identifies a region c7 where the vanishing point is located as the first region, and scales down the first region including the vanishing point using a scale factor less than 1.

Then, the display apparatus scales up a second region excluding the first region among the plurality of regions (the other regions except for region c7) using a scale factor greater than that of the first region.

As illustrated in FIG. 14A, the plurality of regions are scaled using a predetermined scale factor, i.e., a scale factor of 1 for the width w0 and a scale factor of 1 for the height h0.

As illustrated in FIG. 14B, the display apparatus scales down row c and column 7 including the first region using a scale factor less than 1.

For example, the display apparatus scales a width w1 of column 7 including the first region using a scale factor of 0.9 and a height h1 of row c including the first region using a scale factor or 0.9.

Then, the display apparatus scales a width w2 of column 5 and column 6 of the second region using a scale factor of 0.95, a width w3 of column 4 using a scale factor of 1, a width w4 of column 2 and column 3 using a scale factor of 1.05, a width w5 of column 1 using a scale factor of 1.1, a height h2 of row b and row d1 to d7 using a scale factor of 0.95, and a height h3 of row a and row e using a scale factor of 1.1.

In this case, regions in columns 1, 2, and 3 and rows a and e are scaled up.

The display apparatus may adjust the scale factors for the height of column 7 (0.95 for the height h2 and 1.1 for the height h3) while maintaining the scale factor for the height h0 of column 1. Here, the scale factors for the heights of column 2 to column 5 may be adjusted based on an inclination of the columns 1 and 7.

By using different scale factors based on the composition of the object as described above, the display apparatus may accentuate the composition of the object.

FIGS. 15A through 16B are diagrams for describing image scaling when a skyline exists in an image, according to one or more exemplary embodiments.

Figure 15A:
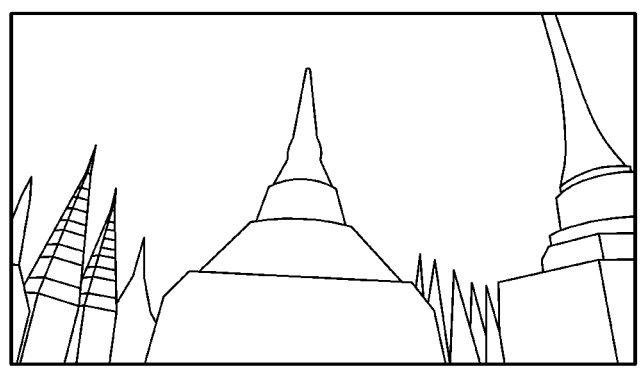
FIGS. 15A through 16B are diagrams for describing image scaling when a skyline exists in an image according to one or more exemplary embodiments.

An image illustrated in FIG. 15A includes objects and the sky.

Figure 15B:
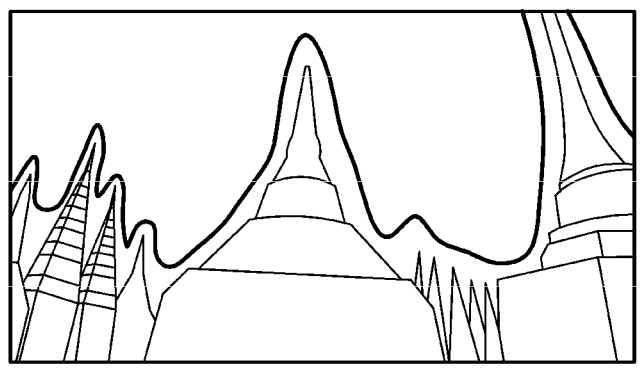

As illustrated in FIG. 15B, the display apparatus detects a skyline by connecting the border lines between the objects and the sky.

The skyline may also be detected by connecting edges of the objects.

Figure 16A:
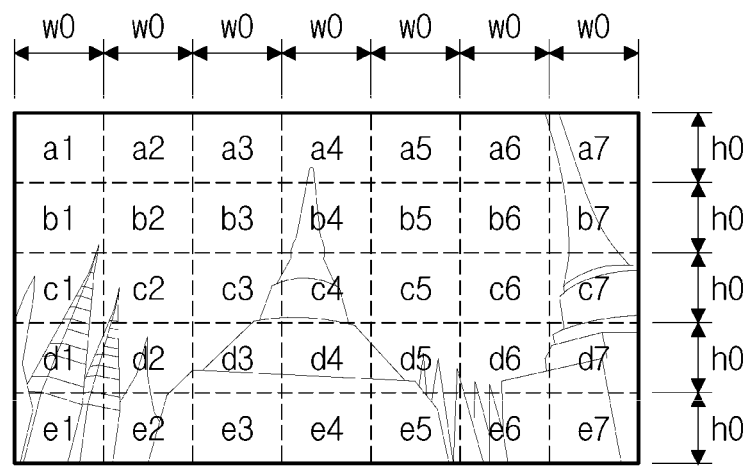

As illustrated in FIG. 16A, the image includes a plurality of regions a1-a7, b1-b7, c1-c7, d1-d7, and e1-e7, and the plurality of regions are formed as blocks having a predetermined size and scaled using the same scale factor. That is, each of the blocks constituting the plurality of regions has a width of w0 and a height of h0.

When the skyline is detected, the display apparatus scales the plurality of regions having the predetermined size using different scale factors so that the plurality of regions have different sizes.

Figure 16B:
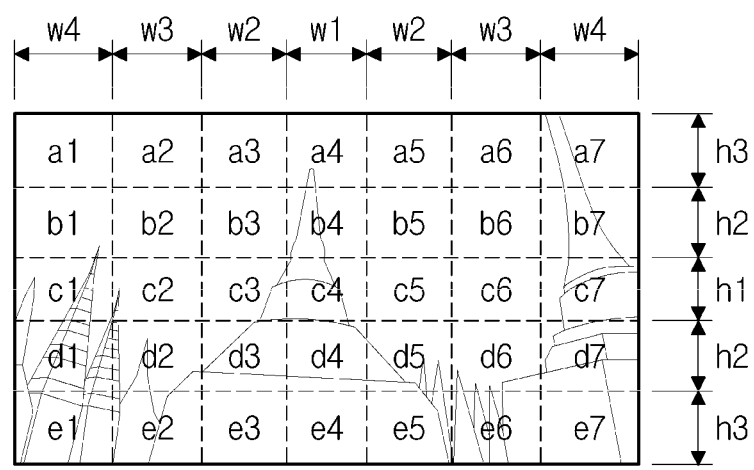

As illustrated in FIG. 16B, the display apparatus sets a predetermined region as a first region and scales down the first region (row c in column 4) using a scale factor less than 1.

Then, the display apparatus scales a second region excluding the first region among the plurality of regions (the other regions except for row c in column 4) using a scale factor greater than that of the first region.

This will be described using examples.

As illustrated in FIG. 16A, the plurality of regions are scaled using a predetermined scale factor, i.e., a scale factor of 1 for the width w0 and a scale factor of 1 for the height h0.

As illustrated in FIG. 16B, the display apparatus scales down row c and column 4 including the first region using a scale factor less than 1.

For example, the display apparatus scales down a width w1 of column 4 including the first region using a scale factor of 0.9 and a height h1 of row c including the first region using a scale factor of 0.9.

Then, the display apparatus scales a width w2 of column 3 and column 5 of the second region using a scale factor of 0.95, a width w3 of column 2 and column 6 using a scale factor of 1, a width w4 of column 1 and column 7 using a scale factor of 1.1, a height h2 of row b and row d using a scale factor of 1, and a height h3 of row a and row e using a scale factor of 1.05.

By adjusting the scale factor for the first region when a skyline is detected to be less than that for the second region as described above, the display apparatus may provide a similar effect as that provided by a curved display.

Figure 17:
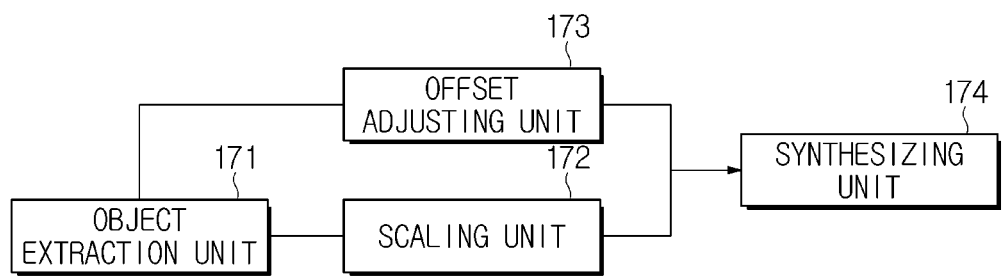
FIG. 17 is a block diagram illustrating a display apparatus according to another exemplary embodiment.

FIG. 17 is a block diagram of a display apparatus according to another exemplary embodiment.

A controller of the display apparatus includes an object extraction unit 171, i.e., an object detection unit or an object detector, a scaling unit 172, i.e., a scaler, an offset adjusting unit 173, i.e., an offset adjuster, and a synthesizing unit 174, i.e., a synthesizer. The object extraction unit 171, scaling unit 172, offset adjusting unit 173, and synthesizing unit 174 may be implemented as hardware, software, or a combination of hardware or software, such as, as a non-limiting example, one or more special or general purpose processors, a memory, and computer code.

The object extraction unit 171 analyzes an image to extract or detect an object.

In this case, the analyzing of the image includes searching for the object by analyzing brightness and definition of the image and a speed, size, height, density, overlay, and color tone of at least one object within the image, and comparing these properties.

The scaling unit 172 sets a region including the object or a region including the object and surrounding regions thereof as a first region and scales up the first region by multiplying the first region by a scaling gain based on, as a non-limiting example, a Gaussian distribution.

The offset adjusting unit 173 calculates a difference between a size of the plurality of regions in the original image and that of the scaled first region and scales a second region, which is the other region except for the first region, based on the calculated difference.

The synthesizing unit 174 synthesizes the scaled first region and second region to output an image in which the object is scaled up.

In addition, a controller according to another exemplary embodiment identifies an aspect ratio of the display and an aspect ratio of the image, respectively. Upon determination that the aspect ratio of the display is different from the aspect ratio of the image, the controller controls the scaling unit and the offset adjusting unit to further scale up the previously scaled first region and second region using predetermined scale factors, thereby minimizing blanks on sides of the display.

That is, upon determination that the aspect ratio of the display apparatus is 21:9 and the aspect ratio of the image is 16:9, the display apparatus controls the scaling unit and the offset adjusting unit to further scale the previously scaled first region and second region using predetermined scale factors.

Figure 18:
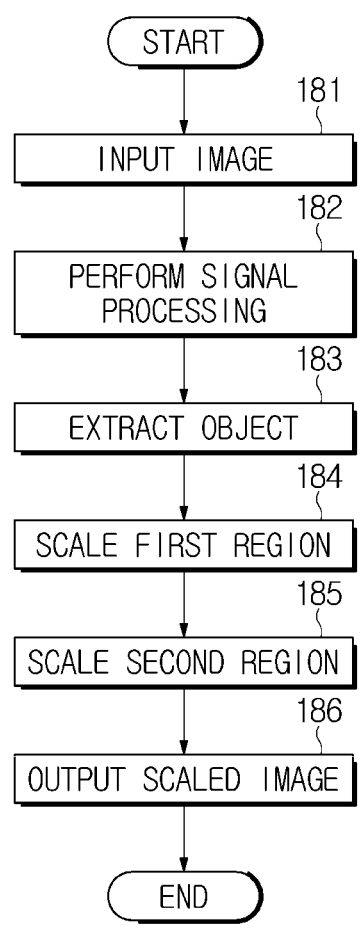
FIG. 18 is a flowchart of a method of controlling a display apparatus according to another exemplary embodiment.

FIG. 18 is a flowchart illustrating a method of controlling a display apparatus according to another exemplary embodiment.

When a power-on signal is input to the physical input 130 or the receiver 156, the display apparatus is powered on and displays a standby screen, displays an image of broadcast signals of a previously selected channel in a television, or displays an image of input content when a command to reproduce the content is input by a user.

That is, the display apparatus receives an image through a tuner unit, an interface, or a storage (181) and performs signal processing on the input image (182).

The signal processing includes separating image signals from sound signals and may also include converting analog image signals into digital image signals.

Then, the display apparatus analyzes the signal-processed image and extracts an object based on the analysis results (183).

In this case, the extracting of the object may include analyzing brightness of images of a plurality of frames and a speed, size, height, density, and color tone of at least one object in the plurality of frames, and comparing these properties.

Then, the display apparatus sets one region including the object among the plurality of regions as a first region and sets the other region(s) of the plurality of regions as a second region.

Regions surrounding the region including the object may also be set as the first region.

Then, the display apparatus adjusts scaling of the image by scaling up the first region using a predetermined scale factor (184) and scaling down the second region based on a predetermined scale factor (185) and outputs the scaled image (186).

Here, the predetermined scale factors of the first region are scale factors set based on the Gaussian distribution and are greater than 1.

Figure 19:
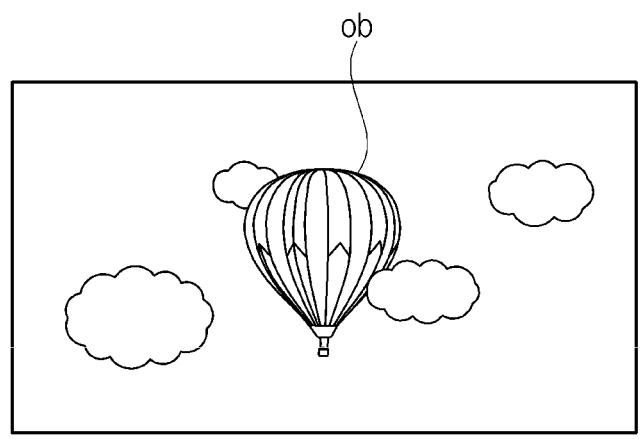
FIGS. 19 through 20B are diagrams for describing up-scaling of an object in an image to be displayed in a display apparatus according to another exemplary embodiment.
Figure 20A:
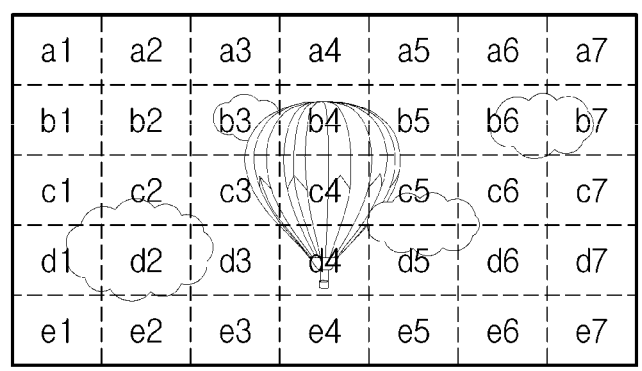
Figure 20B:
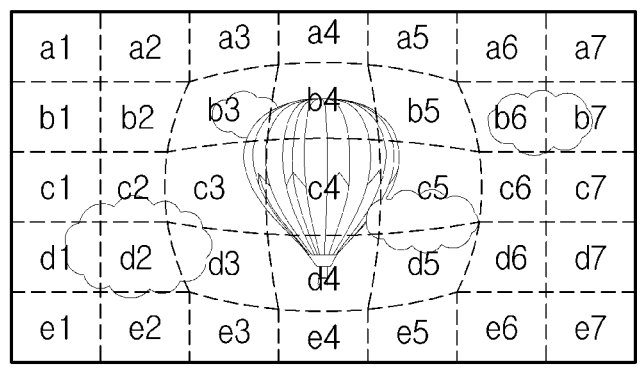

FIGS. 19 through 20B illustrate up-scaling of an object in an image according to one or more exemplary embodiments.

As illustrated in FIG. 19, the display apparatus detects an object ob in the image.

As illustrated in FIG. 20A, the image includes a plurality of regions a1-a7, b1-b7, c1-c7, d1-d7, and e1-e7, and the plurality of regions are formed as blocks having a predetermined size and scaled using the same scale factor. That is, each of the blocks constituting the plurality of regions has a width of w0 and a height of h0.

The display apparatus scales the plurality of regions using different scale factors based on the detection results of the object so that the plurality of regions have different sizes.

As illustrated in FIG. 20B, the display apparatus identifies the position of the object, identifies a first region b3, b4, b5, c3, c4, c5, and d4 where the object is located, and scales up the first region b3, b4, b5, c3, c4, c5, and d4 including the object using a scale factor greater than 1.

In this case, up-scaling of the first region may include scaling a central region c4 of the object using a greater scale factor and scaling regions b3, b4, b5, c3, c5, and d4 surrounding the central region c4 using a scale factor less than that of the central region.

Then, the display apparatus scales a second region, which includes the other regions of the object excluding the first region among the plurality of regions, using a scale factor less than that of the first region.

Here, the scaling of the second region is reducing the size of the second region in consideration of the increase in size of the up-scaled first region. By reducing the size of the second region in consideration of the degree of size adjustment of the first region, an image including the emphasized object and having the same size as the original image may be acquired.

That is, the display apparatus scales down the second region.

Also, when the second region is scaled, the display apparatus may scale one region of the second region closer to the first region using a lower scale factor than another region of the second region farther from the first region.

For example, the display apparatus scales some regions of the second region a2, a3, a4, a5, a6, b2, b6, c2, c6, d2, d6, e2, e3, e4, e5, and e6 closer to the first region using a scale factor less than 1 and scales the other regions of the second region (column 1 and column 7) using a scale factor of 1.

The scale factor for scaling down some regions of the second region a2, a3, a4, a5, a6, b2, b6, c2, c6, d2, d6, e2, e3, e4, e5, and e6 closer to the first region may be determined based on the scale factor of the first region.

The other regions of the second region (column 1 and column 7) may also be scaled using a scale factor greater than that for the some regions of the second region closer to the first region.

The display apparatus may emphasize the object in the image by scaling up the object.

FIGS. 21A through 22B illustrate an image scaling of a display apparatus according to another exemplary embodiment.

Figure 21A:
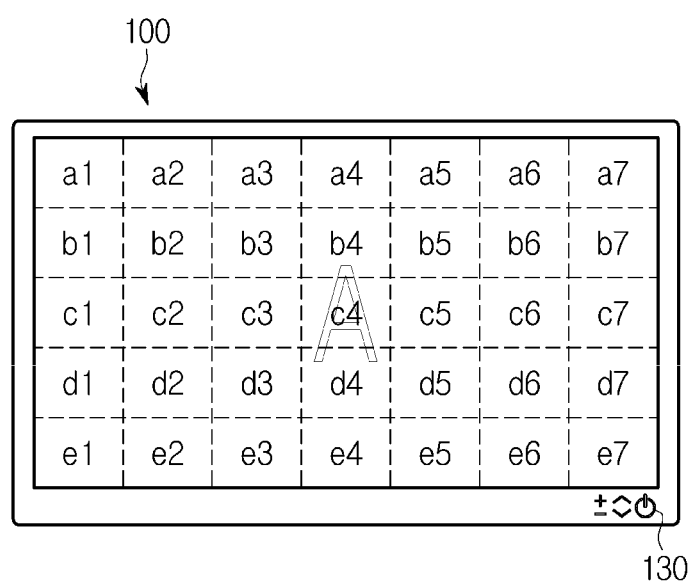
FIGS. 21A through 22B are diagrams illustrating re-scaling of an image to be displayed on a display apparatus according to another exemplary embodiment.
Figure 21B:
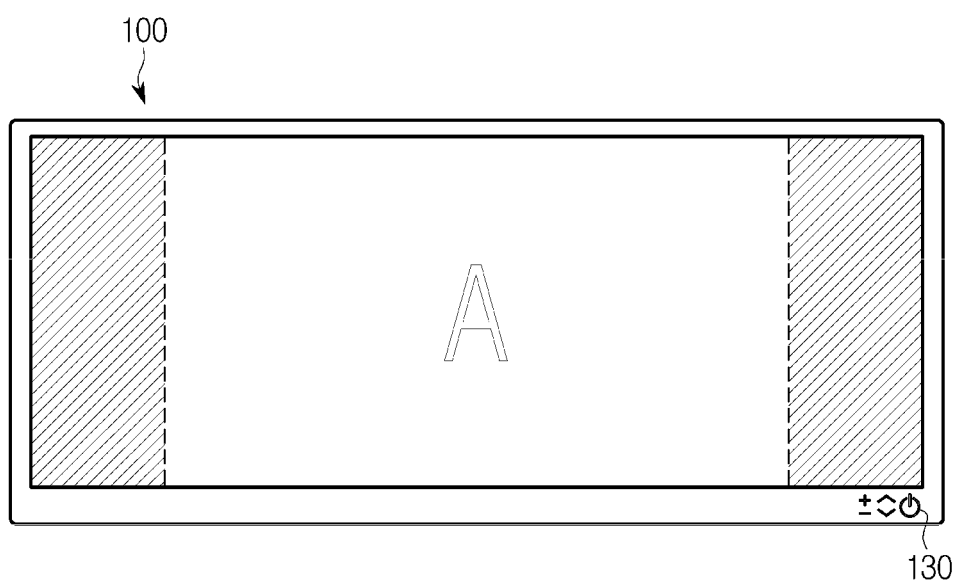

FIG. 21A illustrates a display apparatus including a display having an aspect ratio of 16:9. FIG. 21B illustrates a display apparatus including a display having an aspect ratio of 21:9.

As illustrated in FIG. 21A, when the aspect ratio of an image and the aspect ratio of the display are the same as 16:9, the image may fit the display.

However, when the aspect ratio of an image of 16:9 is different from the aspect ratio of the display of 21:9 as illustrated in FIG. 21B, blanks are generated at both sides of the display.

The display apparatus according to an exemplary embodiment may minimize the size of the blanks generated at the sides of the display by scaling the image when the aspect ratio of the image is different from the aspect ratio of the display and displaying the scaled image on the display.

This will be described in more detail below according to one or more exemplary embodiments.

Figure 22A:
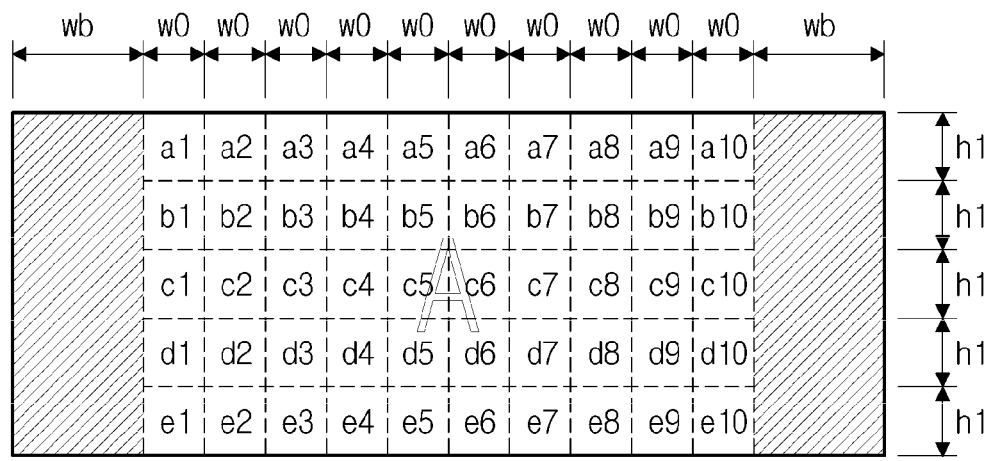
Figure 22B:
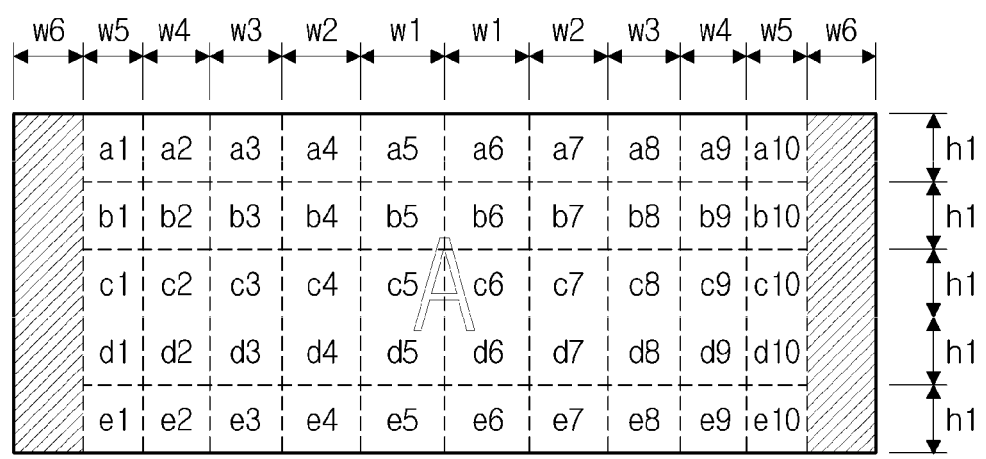

As illustrated in FIG. 22A, the image includes a plurality of regions a1-a10, b1-b10, c1-c10, d1-d10, and e1-e10, and the plurality of regions are formed as blocks having a predetermined size and scaled using the same scale factor.

That is, each of the plurality of regions has a width of w0 and a height of h1.

When the display apparatus displays an image having an aspect ratio different from that of the display apparatus, blanks wb are generated at both sides of the display.

As illustrated in FIG. 22A, the display apparatus extracts an object, identifies a first region including the extracted object, and scales up the identified first region (columns 5 and 6).

The display apparatus scales a width w1 of column 5 and column 6 including the first region using a scale factor of 1.3.

Then, the display apparatus scales a width w2 of column 4 and column 7 of a second region using a scale factor of 1, a width w3 of column 3 and column 8 using a scale factor of 0.9, a width w4 of column 2 and column 9 using a scale factor of 0.8, and a width w5 of column 1 and column 10 using a scale factor of 0.7.

The display apparatus may also scale up rows b, c, and d and scale down rows a and e.

Then, the display apparatus further scales the first region and the second region using a predetermined scale factor (e.g., 1.4).

According to the exemplary embodiment, the object may be emphasized and the width w6 of the blank may be minimized using the display apparatus having the aspect ratio of 21:9.

The controller 153, according to one or more exemplary embodiments, may be provided separately from the remaining elements of the display apparatus 100, and may be configured to scale an input image as described above. The controller 153 may include a processor and a memory. The memory may have stored a program that, when executed by the processor, configures the processor to perform one or more scaling functions.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A display apparatus comprising:
a display; and
a processor configured to detect an object in an input image, divide the image into a first region of the image corresponding to a location of the detected object and a second region of the image corresponding to a region of the input image excluding the first region, adjust the first region and the second region using different scale factors, and control the display to display the image having the adjusted first and second regions,
wherein a frame of the input image comprises a plurality of regions having a same size,
wherein the first region comprises one or more regions among the plurality of regions having the same size,
wherein the first region is scaled using a scaling factor less than 1,
wherein the second region comprises a plurality of regions among the plurality of regions having the same size excluding the one or more regions of the first region,
wherein the plurality of regions of the second region are scaled using a scale factor greater than the scale factor of the first region,
wherein a region among the plurality of regions of the second region farther from the first region is scaled using a greater scale factor than another region among the plurality of regions of the second region closer to the first region,
wherein the processor is further configured to scale up the first region using a predetermined scale factor and scale down the second region based on a predetermined scale factor, and wherein the predetermined scale factor is a scale factor corresponding to a Gaussian distribution.

2. The display apparatus according to claim 1, wherein the input image comprises a plurality of frames, and
wherein the processor is further configured to detect motion vectors by comparing a first frame of the plurality of frames with a second frame of the plurality of frames, detect a vanishing point at which the detected motion vectors converge based on the motion vectors, identify a region where the detected vanishing point is located, and set the identified region as the first region.

3. The display apparatus according to claim 1, wherein the processor is further configured to detect a composition of the image, detect a vanishing point based on the detected composition and where the edges of the object meet, identify a region where the detected vanishing point is located, and set the identified region as the first region.

4. The display apparatus according to claim 1, wherein the processor is further configured to determine whether a skyline exists in the input image by determining whether a border line between objects and the sky has a predetermined length or greater and, in response to determining that the skyline exists, set a predetermined region as the first region.

5. A display apparatus comprising:
a display; and
a processor configured to detect motion by comparing objects position in input image within an input image, identify a first region of the input image at which the detected motion converges, adjust the first region and a second region of the input image using different scale factors, and control the display to display the image having the adjusted first and second regions,
wherein a frame of the input image comprises a plurality of regions having a same size,
wherein the first region comprises one or more regions among the plurality of regions having the same size,
wherein the first region is scaled using a scale factor less than 1,
wherein the second region comprises a plurality of regions among the plurality of regions having the same size excluding the one or more regions of the first region,
wherein the plurality of regions of the second region are scaled using a scale factor greater than the scale factor of the first region,
wherein the processor is further configured to scale up the first region using a predetermined scale factor and scale down the second region based on a predetermined scale factor, and wherein the predetermined scale factor is a scale factor corresponding to a Gaussian distribution.

6. The display apparatus according to claim 5, wherein the input image comprises a plurality of frames, and
wherein the processor is further configured to detect motion vectors by comparing a first frame of the plurality of frames with a second frame of the plurality of frames, detect a vanishing point based on the motion vectors, determine a region where the detected vanishing point is located, and set the determined region as the first region.

7. A display apparatus comprising:
a display; and
a processor configured to determine whether a skyline exists in an input image, adjust, in response to determining that a skyline exists in the input image, a predetermined first region and a second region of the input image using different scale factors, adjust, in response to determining that the skyline does not exist in the input image, the first region and the second region using the same scale factor, and control the display to display the image having the adjusted first and second regions,
wherein a frame of the input image comprises a plurality of regions having a same size,
wherein the first region comprises one or more regions among the plurality of regions having the same size,
wherein the first region is scaled using a scale factor less than 1,
wherein the second region comprises a plurality of regions among the plurality of regions having the same size excluding the one or more regions of the first region,
wherein the plurality of regions of the second region are scaled using a scale factor greater than the scale factor of the first region,
wherein the processor is further configured to scale up the first region using a predetermined scale factor and scale down the second region based on a predetermined scale factor, and wherein the predetermined scale factor is a scale factor corresponding to a Gaussian distribution.

8. A display apparatus comprising:
a display; and
a processor configured to detect an object from an input image, scale up a first region of the input image where an object is located using a predetermined scale factor, scale a second region of the input image based on the predetermined scale factor, and control the display to display the image having the image scaled-up first region and scaled second region,
wherein the processor is further configured to scale up the first region using a predetermined scale factor and scale down the second region based on a predetermined scale factor, and wherein the predetermined scale factor is a scale factor corresponding to a Gaussian distribution.

9. The display apparatus according to claim 8, wherein the processor comprises:
an object detector configured to detect the object;
a scaler configured to scale the first region where the object is located using the predetermined scale factor; and
an offset adjuster configured to calculate an offset value corresponding to a difference between a size of the input image and a size of the scaled first region, and to scale the second region based on the calculated offset value.

10. The display apparatus according to claim 7, wherein the processor is further configured to further scale the scaled first region and second region using the predetermined scale factor when an aspect ratio of the display is different from an aspect ratio of the input image.

11. A method of controlling a display apparatus, the method comprising:
detecting an object from an input image;
dividing the input image into a first region including the detected object and a second region excluding the first region;
adjusting the first region and second region using different scale factors; and
outputting the image having the scaled-up first region and scaled second region,
wherein the adjusting the first region and second region using different scale factors comprises: scaling up the first region using a predetermined scale factor; and scaling down the second region based on the predetermined scale factor,
wherein the predetermined scale factor is a scale factor corresponding to a Gaussian distribution,
wherein the adjusting the first region and second region using different scale factors comprises:
scaling the first region using a scale factor less than 1; and
scaling the second region using a scale factor greater than the scale factor of the first region.

12. The method according to claim 11, wherein dividing the input image comprises:
detecting motion based on the detected object within the input image;
identifying a region at which the detected motion converges based on the detected object; and
setting the identified region as the first region.

13. The method according to claim 11, wherein the dividing the input image into the first region comprises:
detecting a composition of the image based on the detected object and the edges of the object meet;
detecting a vanishing point based on the detected composition and where the edges of the object meet;
identifying a region where the detected vanishing point is located; and setting the identified region as the first region.

14. The method according to claim 11, wherein the dividing the input image comprises:
determining whether a skyline exists in the input image based on edges of the detected object and a border line between objects; and
setting, in response to determining that the skyline exists, a predetermined region as the first region.

15. A processor comprising:
a processor; and
a memory storing a program,
wherein, when the program is executed by the processor, the processor is configured to:
detect a point of interest in an input image,
divide the input image into a first region including the point of interest and a second region not including the point of interest,
scale the first region and the second region using different scale factors, and
output the image having the scaled first and second regions,
wherein the processor is further configured to scale up the first region using a predetermined scale factor and scale down the second region based on a predetermined scale factor, and wherein the predetermined scale factor is a scale factor corresponding to a Gaussian distribution.

16. The processor according to claim 15, wherein, when the program is executed by the processor, the processor is further configured:
detect motion within the input image,
determine a point where the detected motion converges, and
select the point where the detected motion converges as the point of interest.

17. The processor according to claim 15, wherein, when the program is executed by the processor, the processor is further configured:
determine whether a skyline exists in the input image,
select, in response to determining that a skyline exists in the input image, a predetermined point as the point of interest, and
select a predetermined first region based on the predetermined point as first image.

18. The processor according to claim 15, wherein, when the program is executed by the processor, the processor is further configured:
detect an object within the input image, and
select the object as the point of interest.

* * * * *